United States Patent [19]

Leon

[11] Patent Number: 5,156,362

[45] Date of Patent: Oct. 20, 1992

[54] JET ENGINE FAN NACELLE

[75] Inventor: Ross M. Leon, Cincinnati, Ohio

[73] Assignee: General Electric Company, Cincinnati, Ohio

[21] Appl. No.: 708,330

[22] Filed: May 31, 1991

[51] Int. Cl.⁵ .......................................... B64C 23/06
[52] U.S. Cl. .................................... 244/199; 244/130; 244/53 B
[58] Field of Search ..................... 244/130, 199, 53 R, 244/53 B

[56] References Cited

U.S. PATENT DOCUMENTS

| | | | |
|---|---|---|---|
| 2,694,357 | 11/1954 | Lee | 98/1 |
| 3,578,264 | 5/1971 | Kuethe | 244/41 |
| 3,765,623 | 10/1973 | Donelson et al. | 244/53 B |
| 3,770,228 | 11/1973 | Traksel et al. | 244/53 B |
| 4,174,083 | 11/1979 | Mohn | 244/53 B |
| 4,466,587 | 8/1984 | Dusa et al. | 244/121 |
| 4,540,143 | 9/1985 | Wang et al. | 244/199 X |
| 4,685,643 | 8/1987 | Henderson et al. | 244/199 |
| 4,696,442 | 9/1987 | Mazzitelli | 244/53 B |
| 4,836,473 | 6/1989 | Aulehla et al. | 244/130 |
| 4,865,268 | 9/1989 | Tracksdorf | 244/53 B |
| 4,884,772 | 12/1989 | Kraft | 244/199 |

Primary Examiner—Charles A. Marmor
Assistant Examiner—Carla Mattix
Attorney, Agent, or Firm—Douglas E. Erickson; Jerome C. Squillaro

[57] ABSTRACT

A jet engine fan nacelle which maintains attached flow during engine windmilling. The nacelle includes a cylindrical airfoil body having an inner surface. A plurality of vortex generators are positioned on the inner surface between the nacelle body's leading edge and its throat within ninety degrees of rotation from the crown line hilite about the nacelle's longitudinal axis. The vortex generators energize the airflow to maintain an attached flow around the leading edge and along the outer surface of the nacelle's body without separating from the outer surface which would produce an undesirable increase in drag.

10 Claims, 3 Drawing Sheets

JET ENGINE FAN NACELLE

BACKGROUND OF THE INVENTION

The present invention relates generally to jet aircraft gas turbine engines which have fan blades, and more particularly to a nacelle which surrounds such fan blades.

A gas turbine engine includes a core engine having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine engine adds a low pressure turbine (located aft of the high pressure turbine) which is connected by a smaller diameter coaxial shaft to drive the front fan (located forward of the high pressure compressor) and which may also drive a low pressure compressor (located between the front fan and the high pressure compressor). The low pressure compressor sometimes is called a booster compressor or simply a booster. An engine casing, which surrounds the compressor and turbine blades, has a forward portion called a flow splitter. The flow splitter is located between the fan and the first (usually the low pressure) compressor to separate the air which exits the fan into a core engine airflow and a coaxially surrounding bypass airflow. The bypass airflow from the fan provides most of the engine thrust. Some of the engine thrust comes from the core engine airflow after it flows through the low and high pressure compressors to the combustor and is accelerated past the high and low pressure turbines and out the exhaust nozzle.

The front fan includes a fan nacelle which surrounds the fan blades and which is attached to the engine casing by hollow fan frame struts. The fan nacelle includes a generally cylindrical and longitudinally extending airfoil body having an inner surface which helps to channel the fan bypass airflow in a longitudinally aft direction for efficient production of engine thrust. The fan nacelle, like any object placed in an airstream, will produce unwanted drag. Drag is significantly decreased if the air not going through the fan nacelle can stay attached to the fan nacelle's outer surface while flowing past such outer surface. If such flow separates from the fan nacelle's outer surface, drag increases significantly. This happens during what is called engine windmilling, which occurs when that particular engine is not operating.

A known technique for reducing fan nacelle drag during engine windmilling is to make the fan nacelle thicker so that the airflow will go around less sharp of a turn at the front and not separate from the outer surface of the fan nacelle. Since it is undesirable to decrease the size of the fan blades, such a nacelle necessarily will have a larger diameter outer surface. However, this causes a substantial increase in fan nacelle size and weight. The increased weight of such a nacelle would itself lower aircraft performance. Also, some aircraft have wing mounted engines whose fan nacelles can't be made any larger and still clear the ground.

SUMMARY OF THE INVENTION

It is an object of the invention to provide a jet engine fan nacelle which maintains attached flow during engine windmilling without a substantial increase in fan nacelle size or weight.

The invention provides a jet engine fan nacelle which includes a generally cylindrical airfoil body and a plurality of vortex generators. The body has a longitudinal axis, a generally circular leading edge including a crown line hilite, a generally circular throat, and an inner surface. The inner surface extends from the leading edge to the throat. The vortex generators protrude from (or are protrudable from) the inner surface and are positioned between the leading edge and the throat within generally ninety degrees of rotation from the crown line hilite about the longitudinal axis. By "within ninety degrees of rotation" is meant a rotation within plus or minus ninety degrees. The vortex generators energize the boundary layer airflow so that such flow going around the fan nacelle's leading edge will remain attached all along the fan nacelle's outer surface. The vortex generators therefore insure that such flow will not separate from the nacelle's outer surface which would produce an undesirable increase in drag.

The benefit and advantage derived from the jet engine fan nacelle of the invention is that attached flow is maintained over the outer surface of the fan nacelle during engine windmilling, so as to avoid increased drag, without adding any size or appreciable weight to the fan nacelle.

BRIEF DESCRIPTION OF THE DRAWINGS

The accompanying drawings illustrate several preferred embodiments of the present invention wherein.

DETAILED DESCRIPTION OF THE INVENTION

Figure 1:
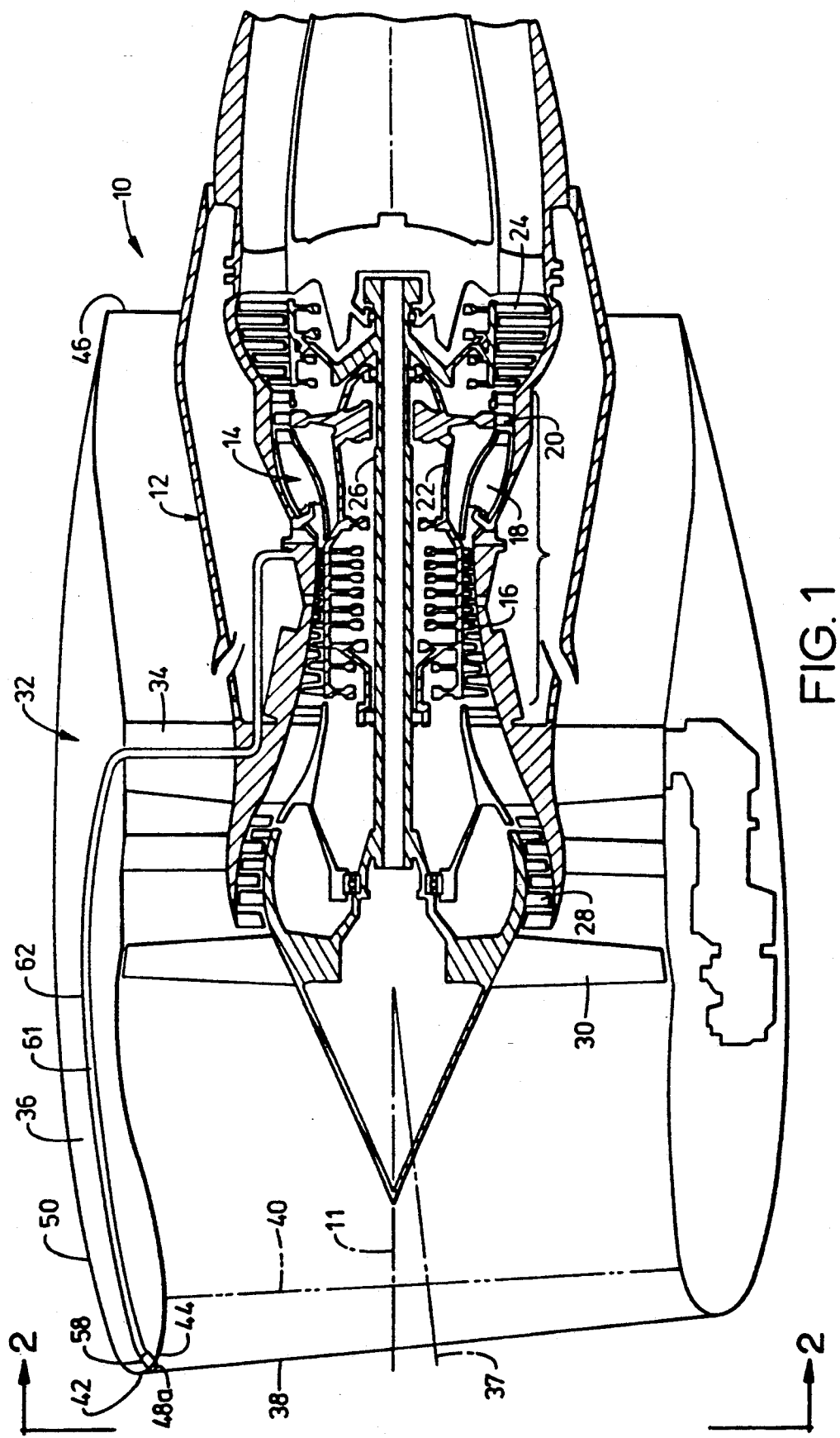
FIG. 1 is a schematic side view of a front fan gas turbine engine disclosing a preferred embodiment of the jet engine fan nacelle invention which includes a protrudable vortex generator and means for extending it from, and retracting it into, the nacelle's inner surface.
Figure 2:
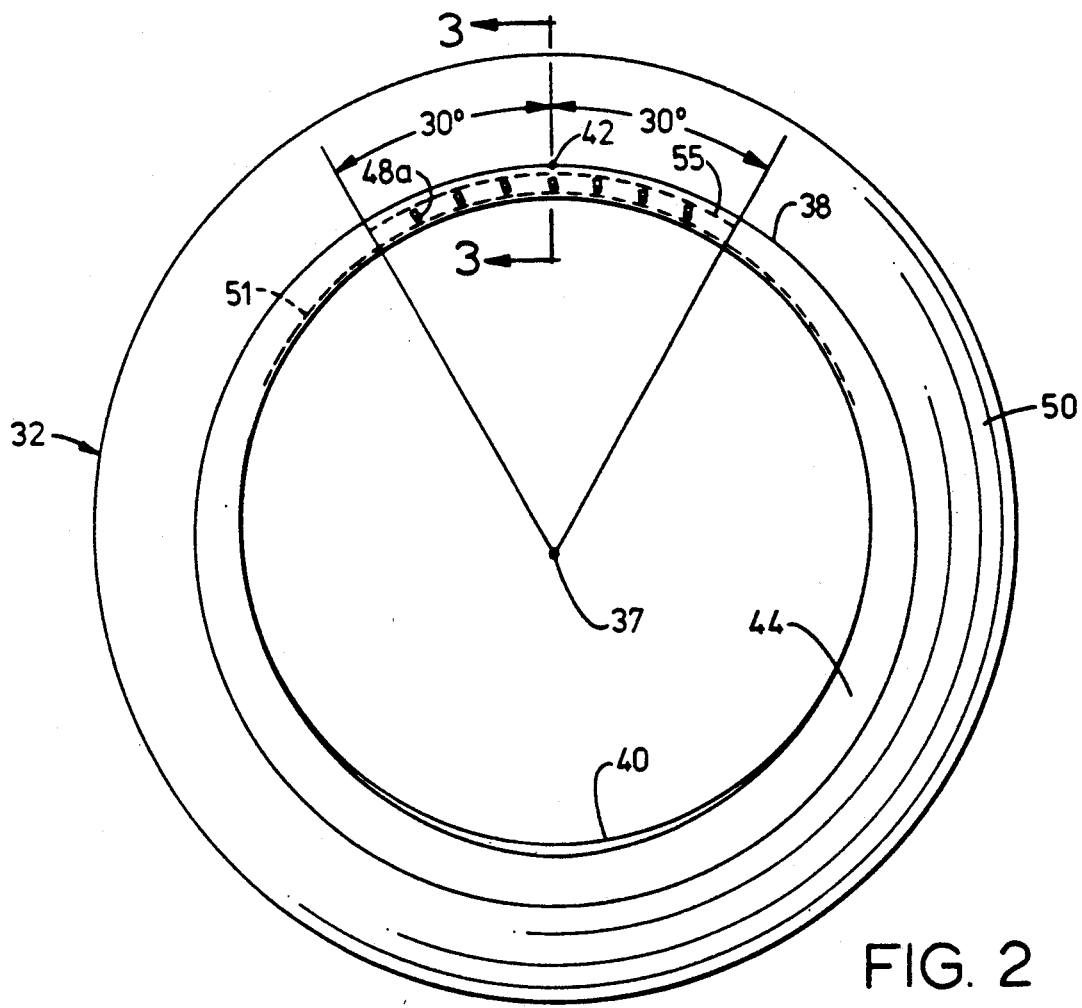
FIG. 2 is a schematic front view taken along the direction of lines 2—2 of FIG. 1.

Referring now to the drawings, and particularly to FIGS. 1 and 2, there is illustrated generally a jet aircraft front fan gas turbine engine, generally designated 10, which includes a preferred embodiment of the invention as hereinafter described. The turbofan engine 10 has a longitudinal centerline 11 and an annular casing 12 disposed coaxially and concentrically about the centerline 11. The turbofan engine 10 includes a core engine (also called a gas generator) 14 which is comprised of a high pressure compressor 16, a combustor 18, and a high pressure turbine 20, all arranged coaxially about the longitudinal axis 11 of the turbofan engine 10 in a serial, axial flow relationship. An annular drive shaft 22 fixedly interconnects the high pressure compressor 16 and the high pressure turbine 20.

The core engine 14 is effective for generating combustion gases. Pressurized air from the high pressure compressor 16 is mixed with fuel in the combustor 18 and ignited, thereby generating combustion gases. Some work is extracted from these gases by the high pressure turbine 20 which drives the compressor 16. The remainder of the combustion gases are discharged from the core engine 14 into a low pressure or power turbine 24. The low pressure turbine 24 turns a drive shaft 26 which drives an interconnected low pressure compressor (also called booster or booster compressor) 28 and fan blades 30. Various engine bearings support the rotating shafts 22 and 26 within the engine casing 12.

The fan blades 30 are housed within a fan nacelle 32 which is attached to the engine casing 12 by a plurality of hollow fan struts 34, only two of which are shown in FIG. 1. The fan nacelle 32 can be looked at as an airfoil wrapped around a cylinder. The jet engine fan nacelle 32 includes a generally cylindrical airfoil body 36 having a longitudinal axis 37 which generally droops by a small angle with respect to the engine's centerline 11. The nacelle's body 36 also has a generally circular leading edge 38 and a generally circular throat 40. The leading edge 38 is the longitudinally forward-most portion of the nacelle's body 36 while the throat 40 is the radially narrow-most forward portion of the nacelle's body 36. The leading edge 38 includes a crown line hilite 42 which is the design vertical point of the leading edge 38. This simply means that any fan nacelle 32 is designed such that its generally circular leading edge 38 is to be rotated such that some predetermined point, called the crown line hilite 42, should be vertical up when the fan nacelle 32 is installed on the aircraft. The nacelle's body 36 has an inner surface 44 which extends from the leading edge 38 to the throat 40 and on to the trailing edge 46.

The jet engine fan nacelle 32 also includes a plurality of vortex generators 48a and/or 48b which protrude from (FIG. 3), or are protrudable from (FIGS. 1, 2, 4, and 5), the inner surface 44. The vortex generators 48a and 48b are disposed between the leading edge 38 and the throat 40 within generally ninety degrees of rotation from the crown line hilite 42 about the longitudinal axis 37. To produce a good vortex, each vortex generator 48 usually is tilted slightly with respect to a radius line drawn from the axis 37 to that vortex generator 48.

To more precisely locate the vortex generators 48a and 48b for improved fan nacelle 32 performance, a discussion of stagnation streamlines is required. The airflow streamlines which strike the fan nacelle 32 in flight include a stagnant portion (the stagnation streamlines) which separate that air which flows around the inner surface 44 from that which flows around the outer surface 50 of the nacelle's body 36. Such stagnation streamlines intersect the inner surface 44 along a generally circular intersection whose shape and location depend on engine operation conditions. When all engines of a multi-engine aircraft are operating at their predetermined cruise conditions, an engine's stagnation streamlines, which can be calculated by those skilled in the art, are referred to as cruise stagnation streamlines. When one engine of the multi-engine aircraft is not operating, that engine is said to be windmilling because the fan blades 30 will rotate in the airflow like a windmill even though that engine is not producing thrust. Its stagnation streamlines, which also can be calculated by those skilled in the art, are referred to as windmill stagnation streamlines.

Figure 3:
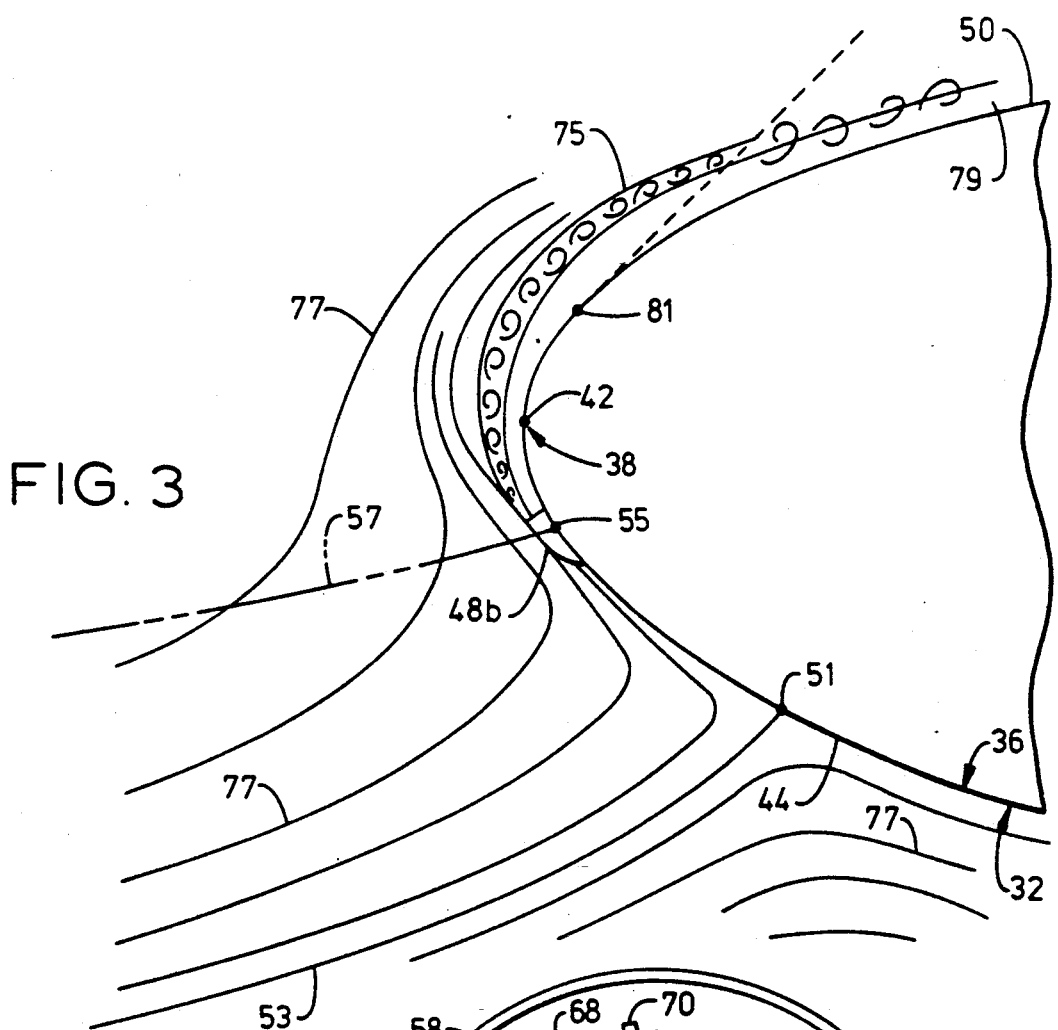
FIG. 3 is an enlarged schematic side view of a portion of the fan nacelle of FIG. 1, but with the protrudable vortex generator of FIG. 1 replaced with a protruding vortex generator of the kind which is fixedly attached to the nacelle's inner surface.

Preferably, the vortex generators 48a and 48b are disposed between the leading edge 38 and the intersection 51 of windmill stagnation streamlines 53 with the inner surface 44 (see FIGS. 2 and 3). Such intersection 51, within generally ninety degrees of rotation from the crown line hilite 42 about the longitudinal axis 37, is seen to be generally a semicircle as shown in FIG. 2.

In an exemplary embodiment, as seen in FIG. 2, the vortex generators 48b are disposed adjacent the intersection 55 of the cruise stagnation streamlines 57 (seen in FIG. 3) with the inner surface 44 within generally thirty degrees of rotation from the crown line hilite 42 about the longitudinal axis 37, and between such intersection 55 and the throat 40. Such intersection 55, within such thirty degrees, is seen to be a generally thirty degree circular arc.

In another exemplary embodiment, as seen in FIG. 3, the vortex generators 48b are disposed generally along the intersection 55 of the cruise stagnation streamlines 57 with the inner surface 44 within generally thirty degrees of rotation from the crown line hilite 42 about the longitudinal axis 37. The vortex generators 48b should not materially affect the airflow when the engine 10 is operating at cruise because they are located in the path of the cruise stagnation streamlines 57.

A vortex generator 48a or 48b is anything, such as a conformal wedge or vane, which protrudes into the airflow at some non-zero angle of attack for the sole purpose of generating a vortex or turbulence in the airflow. Typical vortex generator vanes for a large turbofan nacelle would be on the order of two millimeters thick, two centimeters high, four centimeters long, and spaced four centimeters apart. The particular shape of the vortex generator 48a or 48b is a choice of the artisan and is not considered to be part of the invention. A protruding vortex generator 48b of the kind which is fixedly attached to the nacelle's inner surface 44 is shown in FIG. 3. A protruding vortex generator 48b of the kind which is rotatably attached to the nacelle's inner surface is not shown. However, an example will now be described. A vane is rotatably attached to the nacelle's inner surface and spring biased to return to a zero angle of attack with respect to the airflow. A lever is attached to the vane and to a bellows such that a predetermined difference in the air pressure inside the bellows over the air pressure outside the bellows will overcome the biasing spring to turn the lever and hence turn the vane to a non-zero angle of attack, thereby generating a vortex. A first opening on the nacelle's inner surface positioned near the windmill stagnation streamline serves as the source of the air inside the bellows, while a second opening on the nacelle's outer surface serves as the source of the air outside the bellows. The first opening experiences such predetermined pressure difference over the second opening to overcome the return spring only when the engine is windmilling.

Figure 4:
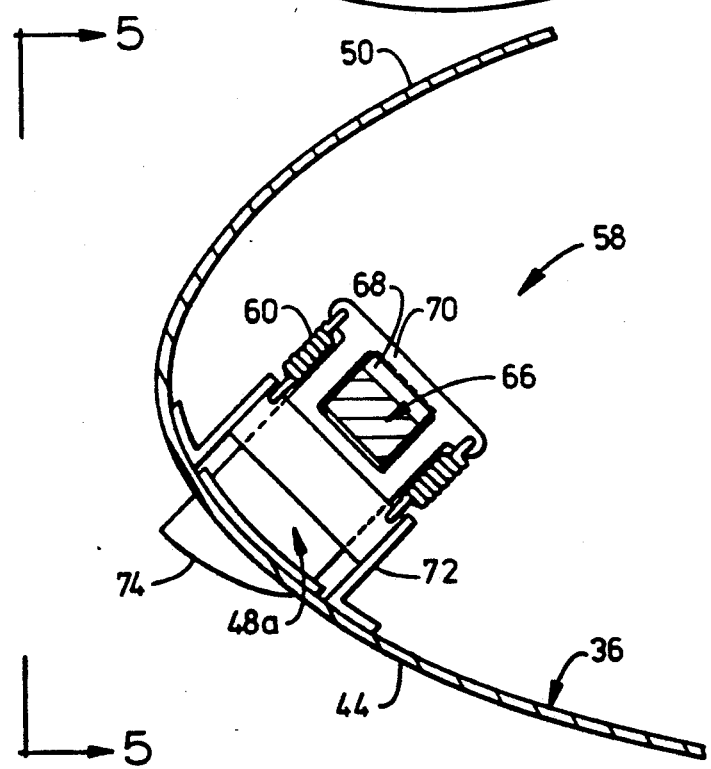
FIG. 4 is an enlarged schematic side view of a portion of the fan nacelle of FIG. 1 disclosing in more detail the mechanism for extending and retracting the vortex generator.
Figure 5:
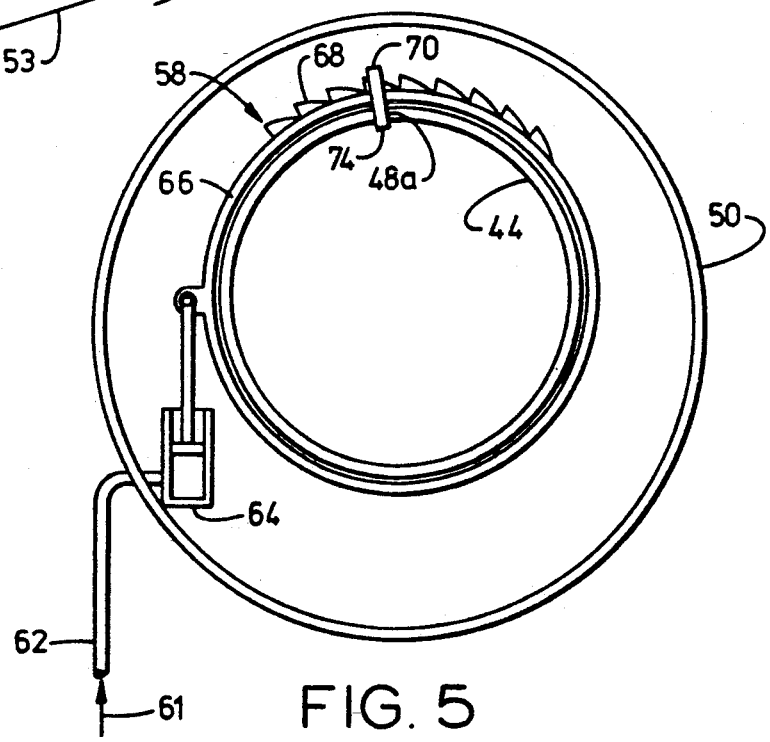
FIG. 5 is a schematic front cutaway view taken along the direction of lines 5—5 of FIG. 4.

A protrudable vortex generator 48a is shown in FIGS. 1, 2, 4, and 5. The fan nacelle 32 also includes means 58 for extending the protrudable vortex generators 48a from the inner surface 44 when the engine 10 is windmilling and for retracting the protrudable vortex generators 48a into the inner surface 44 when the engine 10 is operating at cruise. A retracted vortex generator 48a, regardless of its location, will not affect the airflow. Preferably, such means 58 include a biasing spring 60 for extending the vortex generators 48a, the engine 10 includes compressor bleed air 61, and such means 58 further include a compressor bleed air duct 62 for retracting the vortex generators 48a. As shown in FIGS. 4 and 5, such means 58 further include a pneumatic cylinder 64 which is activated by the compressor bleed air 61 to turn an actuation ring 66 having inclined teeth 68. Each vortex generator 48a has a base portion 70 which rides on a tooth 68 and within a guide 72 attached to the nacelle's body 36. Rotation of the actuation ring teeth 68 causes the vortex generator's base portion 70, and hence its vane portion 74, to retract. During windmilling, the engine 10 will not generate compressor bleed air 61, and the biasing spring 60 will extend the vortex generator 48a so that its vane portion 74 protrudes from the nacelle's inner surface 44 to cause turbulence or vortices in the airflow.

Other means 58 include various positioning mechanisms for extension and retraction, such as: ducting compressor bleed air directly against individual vortex generator base portions to retract their vane portions by overcoming spring biasing; using a reversible electric motor, which rotates on an engine-at-cruise signal and which counterrotates on an engine-not-operating signal, to retract or extend the vortex generators individually or as a group; using an electromagnet to retract the vortex generators when the engine is at cruise and a biasing spring to extend the vortex generators when the engine is not operating; and the like, as can be appreciated by those skilled in the art.

During engine windmilling operation, the vortex generators 48a and 48b create a vortex region 75 in some of the airflow streamlines 77, as seen in FIG. 3. This vortex region 75, in turn, energizes the adjacent boundary layer airflow to produce a region 79 of attached flow over the entire outer surface 50 of the nacelle's body 36. Without such vortex generators 48a and 48b, the flow would separate at a location 81 near the leading edge 38 causing increased drag. The vortex generators 48a and 48b give the most benefit when they are located within thirty degrees of rotation from the crown line hilite 42 about the longitudinal axis 37 (as shown in FIG. 2), with the benefit essentially being lost for any vortex generator located beyond ninety degrees. Scale model tests of the invention have shown a one degree increase in the separation angle (i.e., the nacelle's angle of attack at which flow separation occurs) at windmill conditions. Since a fan nacelle has a requirement for achieving a design windmilling angle of attack without flow separation, the invention can be used to design a thinner fan nacelle. The invention can also be used to help an already designed or built conventional fan nacelle which has fallen slightly short of meeting its requirement, without an expensive redesign or rebuild.

The foregoing description of several preferred embodiments of the invention has been presented for purposes of illustration. It is not intended to be exhaustive or to limit the invention to the precise form disclosed, and obviously many modifications and variations are possible in light of the above teachings (such as use of the invention in an aft-fan gas turbine engine), all of which are within the scope of the claims appended hereto.

I claim:

1. A jet engine fan nacelle comprising:
   (a) a generally cylindrical airfoil body having:
      (1) a longitudinal axis,
      (2) a generally circular leading edge including a crown line hilite,
      (3) a generally circular throat, and
      (4) an inner surface extending from said leading edge to said throat; and
   (b) a plurality of vortex generators protruding from said inner surface and disposed between said leading edge and said throat within generally ninety degrees of rotation from said crown line hilite about said longitudinal axis.

2. The nacelle of claim 1, wherein said vortex generators are disposed between said leading edge and the intersection of windmill stagnation streamlines with said inner surface.

3. The nacelle of claim 1, wherein said vortex generators are disposed generally along the intersection of cruise stagnation streamlines with said inner surface within generally thirty degrees of rotation from said crown line hilite about said longitudinal axis.

4. The nacelle of claim 1, wherein said vortex generators are disposed adjacent the intersection of cruise stagnation streamlines with said inner surface within generally thirty degrees of rotation from said crown line hilite about said longitudinal axis, and between said intersection and said throat.

5. A fan nacelle for a jet engine, said fan nacelle comprising:
   (a) a generally cylindrical airfoil body having:
      (1) a longitudinal axis,
      (2) a generally circular leading edge including a crown line hilite,
      (3) a generally circular throat, and
      (4) an inner surface extending from said leading edge to said throat; and
   (b) a plurality of vortex generators protrudable from said inner surface and disposed between said leading edge and said throat within generally ninety degrees of rotation from said crown line hilite about said longitudinal axis.

6. The nacelle of claim 5, also including means for extending said vortex generators from said inner surface when said engine is windmilling and for retracting said vortex generators into said inner surface when said engine is operating at cruise.

7. The nacelle of claim 6, wherein said vortex generators are disposed for said extending generally along the intersection of cruise stagnation streamlines with said inner surface within generally thirty degrees of rotation from said crown line hilite about said longitudinal axis.

8. The nacelle of claim 7, wherein said means include a biasing spring for said extending and a compressor bleed air duct for said retracting.

9. The nacelle of claim 6, wherein said vortex generators are disposed for said extending adjacent the intersection of cruise stagnation streamlines with said inner surface within generally thirty degrees of rotation from said crown line hilite about said longitudinal axis, and between said intersection and said throat.

10. The nacelle of claim 9, wherein said means include a biasing spring for said extending and a compressor bleed air duct for said retracting.

* * * * *